Sept. 6, 1960     C. W. MILLIKEN     2,951,464
FEEDER
Filed March 7, 1958
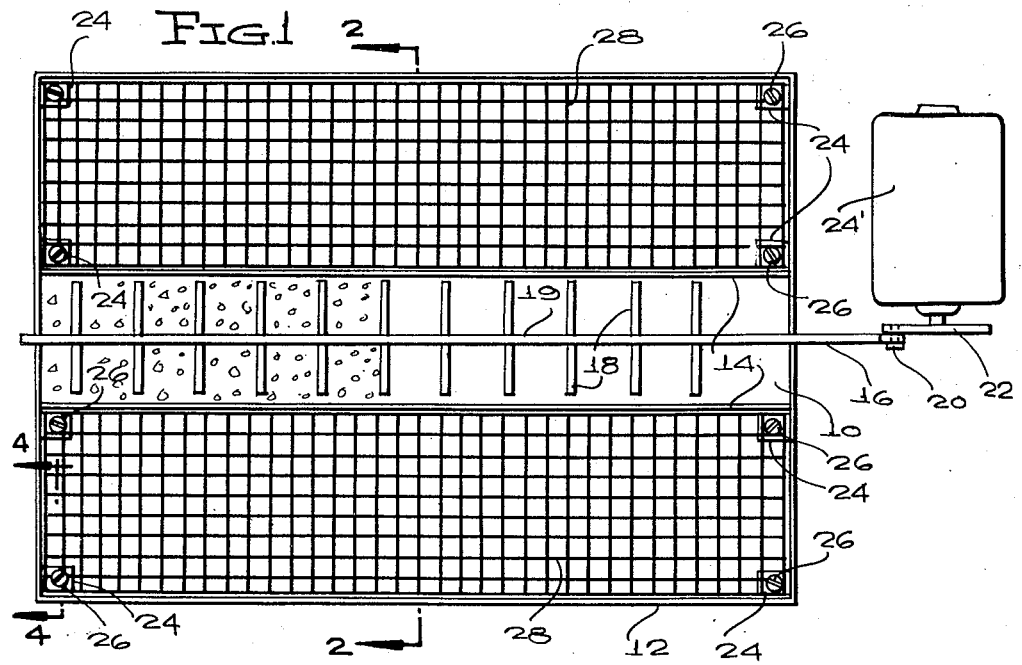
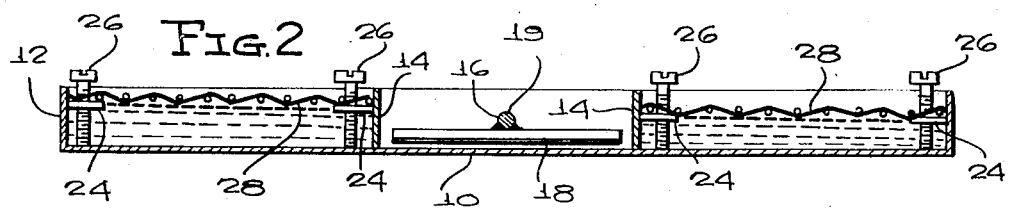
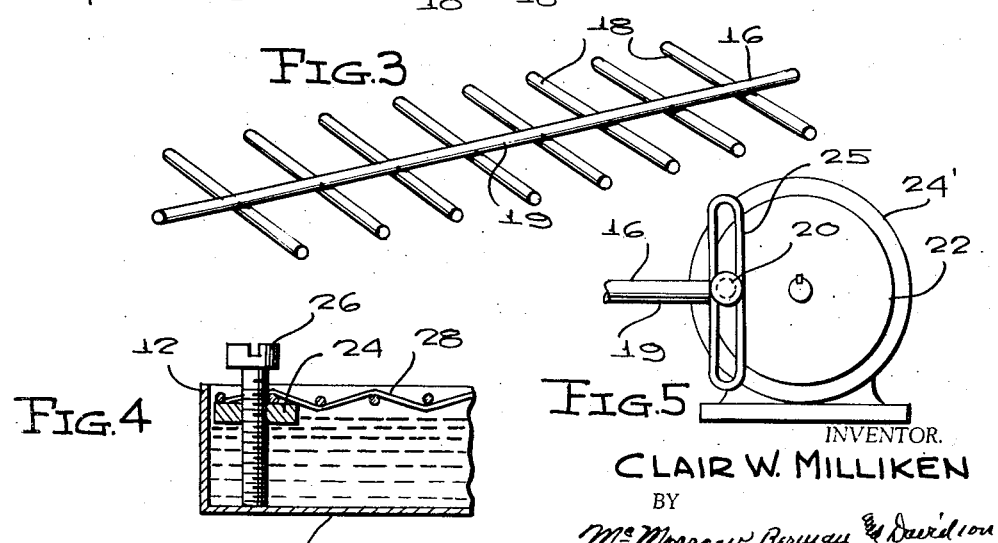
INVENTOR.
CLAIR W. MILLIKEN
BY
McMorrow, Berman & Davidson
Attorneys

United States Patent Office 2,951,464
Patented Sept. 6, 1960

2,951,464
FEEDER
Clair W. Milliken, Box 35, Channahon, Ill.
Filed Mar. 7, 1958, Ser. No. 719,791
2 Claims. (Cl. 119—51.5)

This invention relates generally to feeders, and more particularly has reference to a device which is designed to serve the special purpose of agitating feed in a manner designed to start baby birds on regular feeding habits.

Many types of birds are difficult to be trained to start eating, when not in the presence of their mothers. Baby birds, such as wood ducks and prairie chickens, when raised in capacity, need to be started by offering them feed that has movement. If the feed does not have movement, it will not attract the attention of the baby birds, and they will not learn to start eating.

The main object of the present invention is to provide a feeder which will be of the agitator type, and will be designed for starting baby birds of the type described to eat, without the presence of the mother bird. To this end, the invention includes agitator means which will be especially designed to cause uniform but very distinct agitation of the feed through the entire area of the pan.

Another object is to provide a device of the character described which will comprise a compartmented pan having the agitation means and the feed extending in an area longitudinally and centrally of the pan, said area being bordered at both sides by water trays.

Another object is to provide a feeder of the character described that will be particularly effective in respect to permitting manufacture at low cost, and permitting simultaneous feeding of a number of birds.

Another object is to provide a device as stated in which the agitator means will be of a particular design intended to secure maximum agitation at a low expenditure of power.

Still another object is to provide a feeder for starting baby birds that will include water trays having screen mesh covers readily adjustable to selected heights, with the cover of one water tray being adjustable independently of the cover of the other tray.

Other objects will appear from the following description, the claims appended thereto, and from the annexed drawing, in which like reference characters designate like parts throughout the several views, and wherein:

Figure 1 is a top plan view of a feeder according to the present invention;

Figure 2 is a transverse sectional view, substantially on line 2—2 of Figure 1;

Figure 3 is a perspective view showing a fragmentary portion of the agitator;

Figure 4 is an enlarged, detail sectional view of the water tray cover support means, taken substantially on line 4—4 of Figure 1; and Fig. 5 is an end view of the motor and agitator drive connection.

Referring to the drawing in detail, designated at 10 is a shallow, rectangular tray of sheet metal or the like, having a low upstanding peripheral wall 12.

Extending at opposite sides of the longitudinal center line of the pan, symmetrically in respect to said longitudinal center line, are walls 14.

An agitator 16 includes an elongated, straight rod 19 extending longitudinally and centrally of the pan near the bottom thereof. Spot-welded or otherwise fixedly secured to rod 19 are cross bars 18, underlying rod 19 and projecting in opposite directions from the rod 19 in perpendicular relation thereto.

The cross bars are uniformly spaced along the length of the rod 19, and are disposed close to the bottom of the pan, as shown in Figure 2.

Rod 19 is journalled adjacent its opposite ends in openings provided in opposite ends of the pan. At one end, rod 19 is pivotally connected at 20 to a disc 22 that is connected to the shaft of a motor 24 for rotation therewith. As a result, rotary motion of the disc 22 is translated into a straight line movement of the rod 19.

It will be understood that any suitable means is employed for permitting straight line movement of the rod 19 though the connection 20 thereof travels in a circular path about the axis of rotation of the disc 22. For example, as shown in Figure 5, the rod 19 may be provided with a vertically elongated loop 25 having a slot receiving the connecting pin 20, said slot being vertically elongated and having its upper and lower ends disposed above and below, respectively, the highest and lowest points of movement of the pin 20. In other words, as the pin 20 travels in its circular path, it will shift the rod 19 to right and left in Figure 5, imparting a straight line, reciprocating motion to the rod 19.

Of course, other means can be employed, and in some instances, there may merely be a loose connection of the rod 19 to the disc 22, and a very loose fit of the rod 19 in the openings of the wall of the pan, so that the rod 19 may actually have a certain amount of up-and-down movement as well as its horizontal reciprocation.

The motor may be of a gearhead type, so as to cause a relatively slow rotation of the disc 22, designed to impart a single back-and-forth movement to the agitator means 16, over a predetermined period of time.

Referring now to Figures 2 and 4, in opposite sides of the feed compartment bounded by the walls 14, there are provided water compartments. Each of these is covered by a mesh cover 28, which cover is proportioned to be held against horizontal displacement by the compartment walls. The covers may be of a coarse mesh, and could be, for example, conventional hardware cloth. At the several corners of each water compartment there are provided vertical support legs in the form of screws 26, on which are threaded nuts 24, the screws extending through corner openings of the hardware cloth, which openings are defined by crossed strands of the cloth. The nuts underlie the crossed strands that define the screw-receiving openings, and comprise support ledges. By rotation of the screws relative to the nuts, the nuts are moved upwardly and downwardly along the screw shanks, being held against rotation by the water compartments, so as to locate the mesh covers at selected elevations within the water trays.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A bird feeder comprising a shallow rectangular pan having a bottom wall, end walls, and side walls, a longitudinal partition wall upstanding on said bottom wall and extending between the end walls, said partition wall being parallel spaced from one sidewall and with said one sidewall defining a water compartment, square nuts having sides bearing slidably against inward sides of related walls of said compartment in the corners of the compartment and spaced above the pan bottom wall, a mesh screen loosely disposed in the compartment above and resting upon the nuts, said screen having sides and ends bearing against the inward sides of related walls of the compartment, and vertical screws extending downwardly through corners of the screen and threaded downwardly through the nuts, said screws having free lower ends resting upon the pan bottom wall, said screws being rotatable in the nuts to adjust the height of the screen above the bottom wall, a longitudinally elongated horizontal agitator located within and extending along the trough and having end portions reciprocably mounted on the end walls, and means on one of said end portions for operatively connecting the agitator to agitating means, said agitator comprising a rod having longitudinally spaced crossbars fixed to its under side, said crossbars being located close to the bottom pan wall.

2. A bird feeder comprising a shallow rectangular pan having a bottom wall, end walls, and side walls, a longitudinal partition wall upstanding on said bottom wall and extending between the end walls, said partition wall being parallel spaced from one sidewall and with said one sidewall defining a water compartment, square nuts having sides bearing slidably against inward sides of related walls of said compartment in the corners of the compartment and spaced above the pan bottom wall, a mesh screen loosely disposed in the compartment above and resting upon the nuts, said screen having sides and ends bearing against the inward sides of related walls of the compartment, and vertical screws extending downwardly through corners of the screen and threaded downwardly through the nuts, said screws having free lower ends resting upon the pan bottom wall, said screws being rotatable in the nuts to adjust the height of the screen above the bottom wall, and a second longitudinal partition wall upstanding on said bottom wall and extending to the pan end walls, said second partition wall being parallel spaced from the first mentioned partition wall to define a feed trough extending in the pan along the water compartment, a longitudinally elongated horizontal agitator located within and extending along the trough and having end portions reciprocably mounted on the end walls, and means on one of said end portions for operatively connecting the agitator to agitating means, said agitator comprising a rod having longitudinally spaced crossbars fixed to its under side, said crossbars being located close to the pan bottom wall.

References Cited in the file of this patent
UNITED STATES PATENTS

| | | |
|---|---|---|
| 1,238,349 | Shreve | Aug. 28, 1917 |
| 1,553,502 | Boyes | Sept. 15, 1925 |
| 1,858,421 | Yost et al. | May 17, 1932 |
| 1,871,804 | McGrew | Aug. 16, 1932 |
| 2,213,153 | Warfel | Aug. 27, 1940 |
| 2,484,927 | Blake et al. | Oct. 18, 1949 |
| 2,698,599 | Kalmoe | Jan. 4, 1955 |
| 2,714,950 | Rubin | Aug. 9, 1955 |
| 2,785,792 | Cordis | Mar. 19, 1957 |